United States Patent [19]

Pitel

[11] Patent Number: 4,661,897

[45] Date of Patent: * Apr. 28, 1987

[54] PHASE MODULATED, RESONANT POWER CONVERTING HIGH FREQUENCY LINK INVERTER/CONVERTER

[75] Inventor: Ira J. Pitel, Whippany, N.J.

[73] Assignee: Allied Corporation, Morris Township, Morris County, N.J.

[*] Notice: The portion of the term of this patent subsequent to Feb. 3, 2004 has been disclaimed.

[21] Appl. No.: 782,755

[22] Filed: Oct. 1, 1985

Related U.S. Application Data

[63] Continuation-in-part of Ser. No. 693,955, Jan. 23, 1985.

[51] Int. Cl.$^4$ .................................... H02M 3/335
[52] U.S. Cl. ..................... 363/17; 363/17; 363/98
[58] Field of Search ............ 363/8, 16, 17, 71, 89, 363/97, 98, 131, 132, 157, 159; 323/205, 207, 266

[56] References Cited

U.S. PATENT DOCUMENTS 4,556,937  12/1985  Ziogas et al. ................. 363/132

FOREIGN PATENT DOCUMENTS

42819    4/1981   Japan ..................... 323/205
723751   3/1980   U.S.S.R. ................. 363/157
1128332  12/1984  U.S.S.R. ................. 323/205

Primary Examiner—Peter S. Wong
Assistant Examiner—Judson H. Jones
Attorney, Agent, or Firm—Anibal Jose Cortina

[57] ABSTRACT

The invention relates to a power processing technique and device wherein a tank circuit is excited at resonance, in association with two phase modulated high frequency link converters in an arrangement wherein control of the operation is easily achieved even with operation at resonance. The tank circuit is series resonant and is connected on the primary side of a transformer between two full bridge inverters and serves to control operation of the device even when operated at resonance. The technique finds special utility in power conversion applications.

15 Claims, 19 Drawing Figures

BLOCK DIGRAM OF PHASE MODULATED INVERTER

FIG. 1 BLOCK DIAGRAM OF PHASE MODULATED INVERTER

FIG. 2a
WAVEFORMS OF PHASE-MODULATED INVERTER WITH DC OUTPUT

FIG. 2b
WAVEFORMS OF PHASE-MODULATED INVERTER WITH AC OUTPUT

FIG. 3
SERIES RESONANT TANK CIRCUIT EXECUTED BY $V_3(wt)$

FIG. 7
TANK CIRCUIT IMPEDANCE CONVERTER

FIG. 4
TANK CIRCUIT CURRENT
FOR VARIOUS VALUES
OF Q

FIG. 5
TANK CIRCUIT CURRENT RATE
OF RISE AT WT=0

NOTE: $I_3'(wt) = \frac{\pi R_L}{8 V_m} I_3(wt)$

FIG. 6a
HALF-BRIDGE

FIG. 11
SWITCHING TRAJECTORY
OF TRANSISTORS IN
(a) INVERTER 1, AND
(b) INVERTER 2.

FIG. 6b
PUSH-PULL PHASE MODULATED, RESONANT CONVERTER WITH DC OUTPUT

FIG. 8a
HIGH FREQUENCY LINK INVERTER

FIG. 8b

NOTES: Free Standing Inverter, connect as shown
Utility Interactive Inverters break 100
connection and short 200 connection.

FIG. 9

TRANSISTOR WAVEFORMS AT
VARIOUS PHASE DISPLACEMENTS
INVERTER 1 (LAG)

FIG. 10
TRANSISTOR WAVEFORMS AT
VARIOUS PHASE-DISPLACEMENTS
INVERTER 2 (LEAD)

FIG. 12a

INVERTER OUTPUT CURRENT AT MAXIMUM (UTILITY LOAD AT 240 VOLTS)

FIG. 12b

INVERTER OUTPUT CURRENT AT MINIMUM (UTILITY LOAD AT 240 VOLTS)

FIG. 13a

INVERTER OUTPUT CURRENT AT MAXIMUM (3.3 KW LOAD)

FIG. 13b

INVERTER OUTPUT CURRENT AT HALF POWER SETTINGS (3.3 KW LOAD)

FIG. 14
EFFICIENCY AND POWER FACTOR VERSUS OUTPUT CURRENT AND POWER
(240 V POWER)

PHASE MODULATED, RESONANT POWER CONVERTING HIGH FREQUENCY LINK INVERTER/CONVERTER

CROSS-REFERENCE TO RELATED APPLICATIONS

This application is a continuation-in-part of application Ser. No. 693,955 filed Jan. 23, 1985 and whose disclosure is incorporated by reference herein.

BACKGROUND OF THE INVENTION

This invention relates to a control of high frequency inverters which are phase modulated to produce a dc isolated carrier containing a desired output on its sidebands. The invention is applicable for both dc to dc as well as dc to ac power conversion.

As discussed in parent application Ser. No. 693,955, prior art conventional electrical power inverter devices employ ferroresonant and pulse-width modulation (PWM) technologies. These technologies are low-frequency based and generally employ bulky electromagnetic devices for operation at 60 Hz. In order to overcome the disadvantages attendant PWM technologies, high-frequency links have become preferred for use in grid-connected, photovoltaic inverter applications.

Such applications are generally discussed in:

R. L. Steigerwald, A. Ferraro, F. G. Turnbull, "Application of Power Transistors to Residential and Intermediate Rating Photovoltaic Array Power Conditioners," to be published in the *IEEE Transactions on Industry Applications*.

R. L. Steigerwald and R. E. Tompkins, "A Comparison of High-Frequency Link Schemes for Interfacing a DC Source to a Utility Grid," presented at the IEEE Industry Applications Society Annual Meeting, October 1982.

A. Cocconi, S. Cuk and R. D. Middlebrook, "High-Frequency Isolated 4 KW Photovoltaic Inverter for Utility Interface," PCI/Motor-Con Proceedings, September 1983, pp. 39-59.

W. I. Bower, T. S. Key, B. J. Petterson, "Photovoltaic Power-Conditioning Performance Evaluation, Lessons Learned," presented at the 17th IEEE Photovoltaic Specialist Conference, May 1984.

T. S. Key, "Power Conditioning for Grid-Connected P.V. Systems Less than 250 KW," to be presented at the 19th Intersociety Energy Conversion Engineering Conference, August 1984.

V. T. Ranganathan, P. D. Ziogas, V. R. Stefanovic, "A DC-AC Conversion Technique Using Twin Resonant High Frequency Links," presented at the IEEE Industry Applications Society Annual Meeting, October 1982.

It is particularly advantageous that high frequency link technology be employed because it provides dc isolation and inversion without requiring 60 Hz magnetics. Thus, designs can be smaller and lighter, with a lower cost trend due to advances in the semiconductor art.

These high-frequency link inverters operate to convert dc to ac by means of a high-frequency power carrier (typically 20 kHz or above) containing a complex pattern of sidebands. This signal, when rectified and inverted, produces an ac output having a low-frequency base. The process requires several power conversion stages.

Three conversion stages are normally associated with high-frequency links: high-frequency inversion, rectification and low-frequency inversion. For the first two stages, complex snubber networks are usually required. These networks limit semiconductor stress by shaping load lines within acceptable limits. Newly developed snubbers can also perform this function with very low power loss by first storing transition energy in reactive components, and then releasing it to the sources. Examples of snubber networks known in the prior art are disclosed in:

R. Goldfarb, "A New Non-Dissipative Load-Line Shaping Technique Eliminates Switching Stress in Bridge Converters," Proceedings of Powercon 8, 1981; and by W. J. Shaughnessy, "Modelling and Design of Non-Dissipative LC Snubber Networks", Proceedings of Powercon 7, 1980.

As a further development, resonant power conversion techniques have been recognized as an extremely efficient means of converting power, and have characteristically reduced stress on power semiconductors by switching at substantially zero current or voltages.

For example, such techniques are discussed by I. J. Pitel, the inventor in this application, in U.S. Pat. No. 4,075,476; by F. C. Schwartz and J. B. Klaasens "A 95 - Percent Efficient 1-KW DC Converter with an Internal Frequency of 50 kHz", *IEEE Transactions on Industrial Electronics and Control Instrumentation*, Vol. IECI - 25, No. 4, November 1978, pp. 326-333; and by R. L. Steigerwald, "High-Frequency Resonant Transistor DC-DC Converters" *IEEE Transactions on Industrial Electronics* Vol. IE-31, No. 2, May 1984.

Two major limitations and reasons why resonant power conversion techniques have not gained increased usage are that they are not easily controlled and work well only at full power output.

With conventional 60 Hz, low frequency inverters, the power conversion circuitry is arranged to circulate periodic reactive power between the source and load to maintain a zero average real power output. This is usually done with non-controlled switches, feedback diodes, or sometimes with 60 Hz reactive components as a storage medium. In general, these inverters are characterized as being unidirectional because real power can only flow from the source to the load.

Conventional high frequency links have complicated the flow of 60 Hz reactive power. Periodic circulation of reactive power to the high frequency link occurs over many cycles, and simple feedback diodes have not been viable. A possible technique would be to double the number of switches in an opposing manner to allow bidirectional power flow. Although this method could probably work, it would increase the cost and reduce the practicality of the device.

In a further development as discussed in parent application Ser. No. 693,955, it is known to provide an electrical power inverter and apparatus which includes a high frequency link for converting DC power into AC power. This apparatus includes a first high frequency module for producing a first AC voltage at a first output frequency, and a second high frequency inverter module for producing a second AC voltage at a second output frequency substantially the same as the first output frequency. The second AC voltage is out of phase with the first AC voltage by a selected angular phase displacement. Mixing means mix the first and second AC output voltages to produce a high frequency carrier which has a selected base frequency impressed on the sidebands thereof. Rectifying means then rectify the carrier, which is filtered by filtering means. Output inverting means invert the filtered carrier to produce AC line voltage and power at the selected base frequency. Phase modulating means then adjusts the relative angular phase displacement between the output voltages of the first and second high frequency modules to control the base frequency of the AC line voltage.

In a particular aspect of the prior system, the phase modulating means includes a line voltage referencing means. An amplitude adjustment means selectively controls the magnitude of the line voltage reference, and a first output comparator means compares the inverter AC line voltage with the line voltage reference.

In the system of U.S. Ser. No. 693,955, in one embodiment, resonant-type inverter moqules are employed to operate near resonance throughout the regulation range to provide a high efficiency of up to about 85%–95%. The highly efficient operation reduces heat generation, saves energy, increases the reliability of the electrical components and reduces the size and number of heat sinks required.

As applied to the system of U.S. Ser. No. 693,955, operation below or above resonance in the prior art has typically involved controlling the driving frequency with respect to resonant frequency. The operation below resonance causes the switches of the system to experience a leading power factor which improves turn-off switching trajectories and allows anode commutation. The operation above resonance improves turn-on switching trajectories and permits use of standard recovery diodes intrinsic to Darlington and FET transistors. In either case it is desirable to operate as close to resonance as possible because it increases output.

Operation at resonance on the other hand is normally in non-controlled applications because the driving frequency is locked to the resonant frequency of the tank circuit. Accordingly, prior to now control of the operation has not been possible.

SUMMARY OF THE INVENTION

It is thus an object of the present invention to provide a power processing technique wherein a tank circuit is excited at resonance, in association with two phase modulated high frequency link inverters in an arrangement wherein control of the operation can be easily achieved even with operation at resonance.

This and other objects will become more readily apparent from a reading of the remaining portions of the disclosure.

In accordance with the invention, the system is arranged for operation with the tank circuit excited at resonance, in combination with two phase modulated inverters. More particularly two full bridge inverting means are arranged at an input power processing stage with full bridge inverting means at our output power processing stage. Tank circuit means is of the type which is series resonant, and is connected on the primary side of transformer means between the two full bridge inverters means and the tank circuit means. The tank circuit means is for controlling operation even when operated at resonance.

The described device provides that the operation exhibits a combined performance of the alternative groups with the control range expanded to include zero output. In accordance with the method and device of the invention, a high frequency link inverter is provided which produces sinusoidal outputs at utility frequencies. With the tank circuit, The device provides that the source can be converted to a high impedance regardless of load. The device finds special utilities in utility interactive applications, DC to DC switch mode power supplies, standby power - photovoltaic power converters, AC motor drivers, negative impedance load applications such as gaseous discharge lighting and/or any other such applications as will be readily apparent to those of ordinary skill in the art.

BRIEF DESCRIPTION OF THE DRAWINGS

The invention will be more fully understood and further advantages will become apparent when reference is made to the following detailed description of the invention a accompanying drawings wherein.

DETAILED DISCUSSION OF THE INVENTION

As described with reference to the invention, it is noted that in high-frequency link inverters power can be processed in three stages. A first stage involves converting dc voltage to a high-frequency carrier. Typically, this carrier is rectified and then inverted. This technique is generaly discussed in the above-referenced Cocconi et al. and Steigerwald et al. articles. In accordance with the invention, the high-frequency link inverter can be analyzed as a dc to dc converter which can then be applied to obtain an ac output.

For purposes of describing the invention it will be assumed that commutations occur instantaneously, that switches and passive components are lossless, and that the tank circuit employed has a high quality factor Q to be hereinafter defined, with a bandwidth sufficient to suppress harmonics of the driving frequency.

In accordance with the invention, the tank circuit is series resonant and the quality factor Q is defined by the equation $$Q = \frac{W_r L}{R_L} = \frac{1}{W_r C R_L},$$

wherein $W_r$ is the resonant frequency, $R_L$ is the load, and L and C are, respectively, the inductance and capacitance of the tank circuit.

Figure 1:
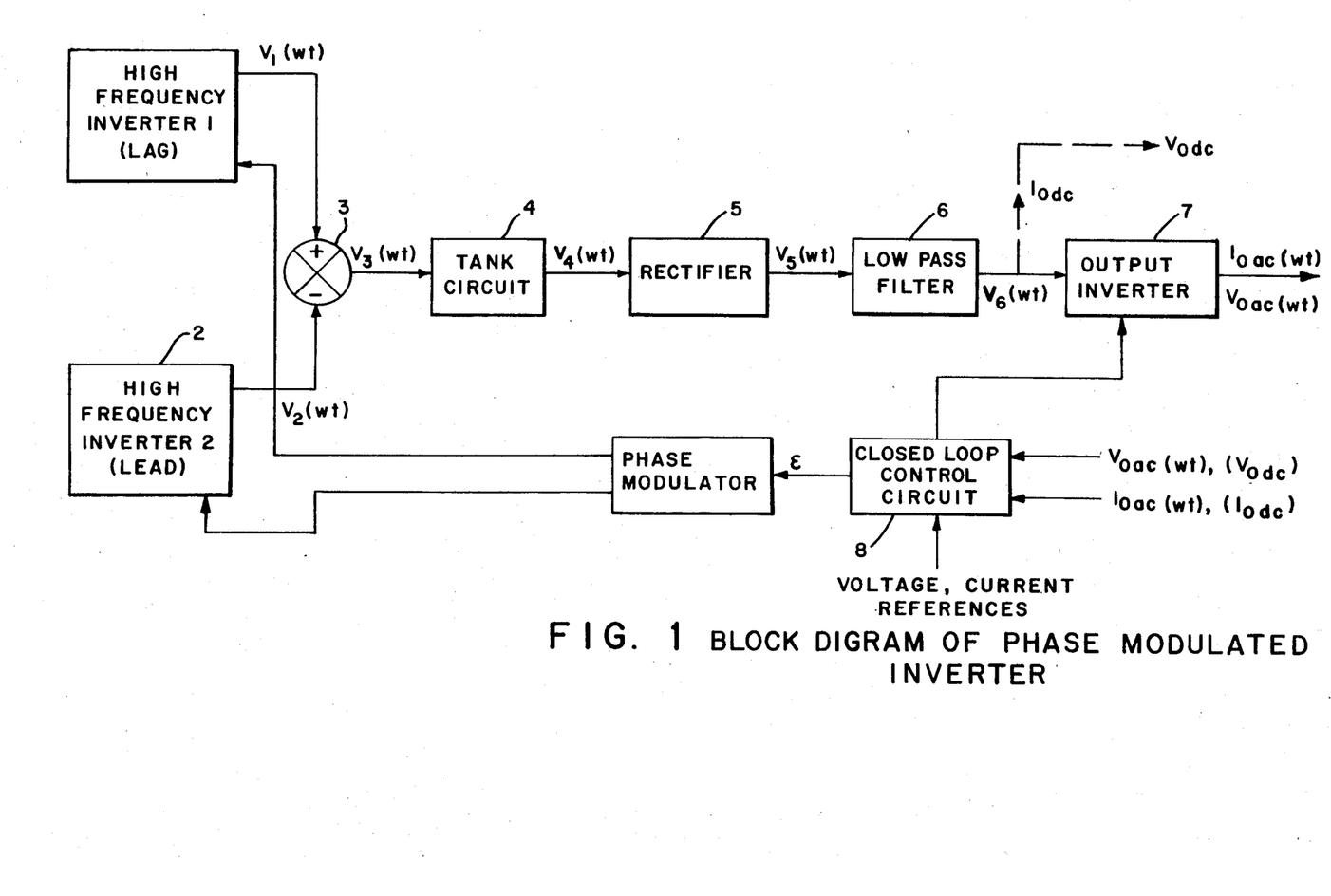
FIG. 1 is a schematic diagram of a phase modulated inverter with dc ouput in accordance with the invention.

In accordance with FIG. 1, a phase modulated inverter with dc output is shown. This is generally the same as that described in parent application U.S. Ser. No. 693,955, which disclosure was specifically incorporated by reference herein.

The high-frequency link inverter, shown in block form in FIG. 1, involves several power conversion stages.

The first stage is comprised of two high-frequency inverter modules 1 and 2 operating into a resonant load. The load is comprised of a resonant tank circuit 4, which naturally shapes the semiconductor load lines to minimize device stresses and associated switching losses.

The first high-frequency inverter module 1 i.e., lag inverter, inverts DC power delivered from a primary power supply, such as battery bank, to produce a voltage $V_{1(wt)}$, which can be expressed by Fourier expansion, as discussed in "Characterization of Programmed-Waveform Pulsewidth Modulation", Pitel et al., *IEEE Trans. Ind. Appl.*, vol. IA-16, No. 5, pp. 707–715, Sept./Oct. 1980, whose disclosure is specifically incorporated by reference herein, as:

$$V_1(wt) = \frac{4V_m}{\pi} \sum_{n=1,3\ldots}^{\infty} \frac{\sin\left(\frac{n\pi}{2}\right)}{n} \cos[n(w_c t - \theta)]$$

The second inverter 2 voltage is given by;

$$V_2(wt) = \frac{4V_m}{\pi} \sum_{n=1,3\ldots}^{\infty} \frac{\sin\left(\frac{n\pi}{2}\right)}{n} \cos[n(w_c t + \theta)]$$

In subsequent stages, the outputs $V_1$ and $V_2$ of the two high-frequency inverter modules 1 and 2, are phased in opposite polarity and mixed in a heterodyning-type processor 3 to produce a difference voltage $V_3$. This difference voltage $V_3$, which contains the desired output voltage encoded on the sidebands of a high frequency carrier is given by:

$$V_3(wt) = V_1(wt) - V_2(wt) =$$

$$\frac{8V_m}{\pi} \sum_{n=1,3\ldots}^{\infty} \frac{\sin\left(\frac{n\pi}{2}\right)}{n} \sin(n\theta) \sin(nw_c t)$$

where $V_m$ is the magnitude of the high-frequency inverter outputs, $W_c$ is the carrier frequency, and $\theta$ is the phase displacement.

$V_3(wt)$ is then applied to the tank circuit 4 which suppresses harmonics of $V_3$. The output from tank circuit 4 is then defined by:

$$V_4(wt) = (8V_m/\pi) \sin(\theta) \sin(w_c t).$$

The voltage $V_4$ from tank circuit 4 is then rectified by rectifier 5 to produce a resultant waveform $V_5$ which is obtained by multiplying $V_4$ with a unit square wave, $H_s(wt)$, in like phase relationship. More specifically, the unit square wave can be expressed as:

$$H_s(wt) = \frac{4}{\pi} \sum_{n=1,3\ldots}^{\infty} \frac{\sin\left(\frac{n\pi}{2}\right)}{n} \cos\left[n\left(w_c t - \frac{\pi}{2}\right)\right]$$

$$= \frac{4}{\pi} \sum_{n=1,3\ldots}^{\infty} \frac{1}{n} \sin(nw_c t)$$

to obtain, by multiplying $V_4$ therewith, through the pass in the rectifier 5, i.e., a full bridge rectifier, a voltage $V_5$, wherein:

$$V_5(wt) = V_4(wt) \cdot H_s(wt) =$$

$$\frac{32V_m}{\pi^2} \sin(\theta) \sum_{n=1,3\ldots}^{\infty} \frac{1}{n} \sin(nw_c t) \sin(w_c t) =$$

$$\frac{16V_m}{\pi^2} \sin(\theta) - \frac{32V_m}{\pi^2} \sin(\theta) \cdot$$

$$\sum_{n=2,4\ldots}^{\infty} \frac{1}{(n+1)(n-1)} \cos(nw_c t)$$

$V_5$ is then applied to a filter 6, typically a low pass filter, wherein terms containing $w_c$ are suppressed to obtain an output:

$$V_{odc} = (16V_m/\pi^2) \sin(\theta)$$

Figure 2A:
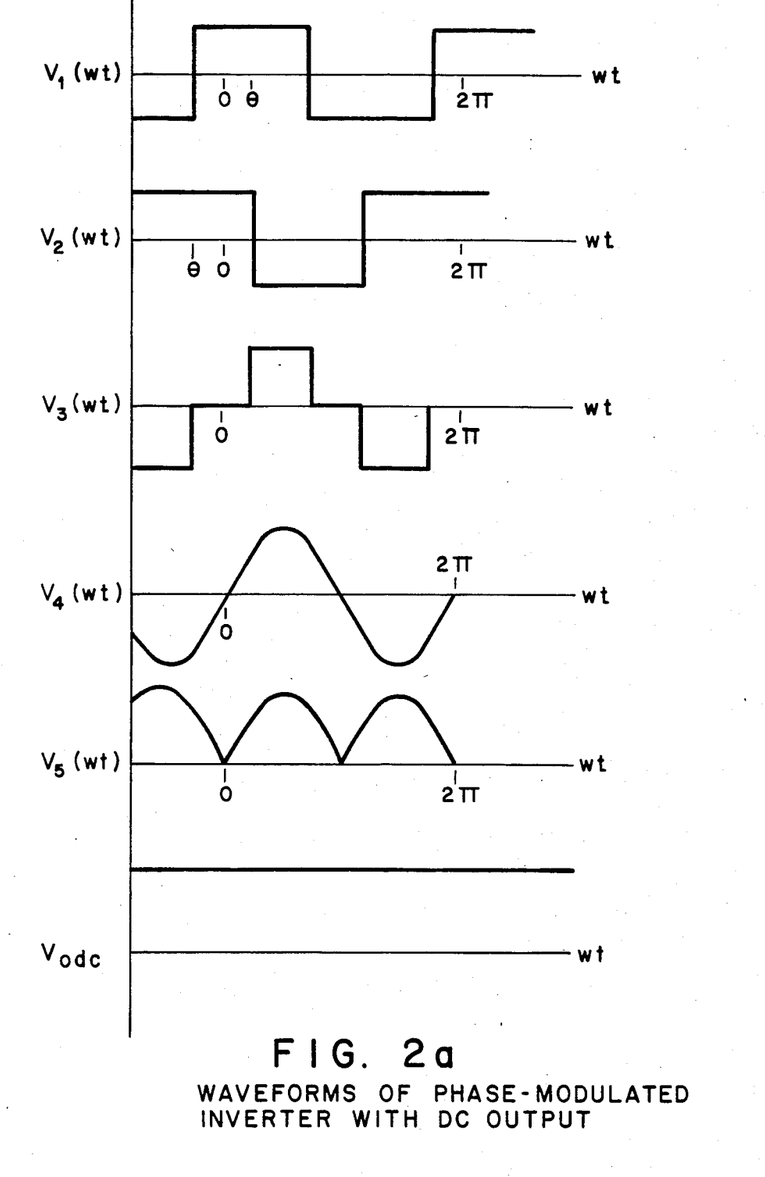
FIG. 2a is a series of graphs of voltages obtained at different points in the circuit of FIG. 1, when the inverters thereof are excited at the resonant frequency of the tank circuit.

The waveforms defined by the above discussed relationships are illustrated in FIG. 2a. As also represented in FIG. 2a, the voltage from the output filtering means which is the low pass filter 6 is in this case not applied to an output inverter 7, and the voltage $V_{odc}$ is obtained.

Referring again to FIG. 1, the inverter of the invention employs, preferably, a closed-loop control circuit 8 whose output controls the phasing of the output of the two resonant inverters 1 and 2.

Since the tank circuit 4 is excited at resonance, inverter output currents typically will be in phase with $V_4$ from the tank circuit 4. This produces a lagging power factor in the first inverter 1 and a leading power factor in the second inverter 2 whereby the total power factor will be unity at maximum and minimum outputs, i.e., when $\theta = \pi/2$ and 0 in the equation defining $V_{odc}$, respectively.

The waveform of $V_3$ represents a PWM, i.e., pulse-width modulated waveform which is common to conventional switching power supplies. The two inverters 1 and 2 are necessary because each inverter 1 and 2 will experience one commutation in operation, either a turn-on or a turn-off, having an improved load line trajectory. The other commutation can also be improve as will be discussed hereinafter. In this regard, if a PWM waveform is produced by one of the inverters 1 or 2, the tank circuit 4 then would have no beneficial effect.

However, since this does not occur, tne improvement in accordance with the invention in part resides in the use of the tank circuit 4 as will be discussed hereinafter.

As described herein, the use of phase modulation provides advantages over frequency modulation. Included among these advantages is that the control range is extended to include zero output. More particularly, with frequency modulation, control range is typically limited by maximum allowed frequency deviation, which limits are generally set by performance constraints such as audible noise, core losses, snubbers and the like. In this invention, the tank circuit 4 can be designed for optimum efficiency at a single frequency and maximum processing power for a given semiconductor switch will be greater because of unity power factor loading.

Figure 2B:
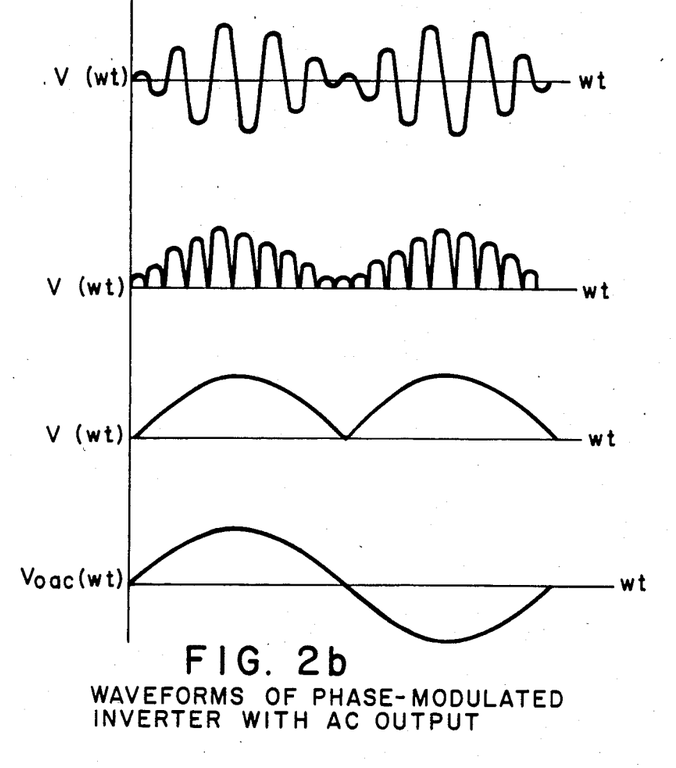
FIG. 2b is a series of graphs similar to FIG. 2a but illustrating the effect on the output as an ac voltage output when the phase displacement is varied.

As illustrated in FIGS. 2b, if $\theta$ is varied over a period of time, the output inverter 7 is enabled to thereby convert the rectified, pulsating dc carrier to a low frequency ac output. Accordingly, the desired waveform for $V_6$ will then be a rectified sine wave and the voltage at this point corresponds to $V_{odc}$ as defined by:

$$V_6(wt) = (16mV_m/\pi^2) |\sin(w_o t)|$$

wherein the constant m is the modulation index and $w_o$ is the desired output frequency. To achieve this result, $\theta$ must be defined as:

$$\theta = \sin^{-1}[m|\sin(w_o t)|]$$

wherein:

$$|\sin(w_o t)| = \frac{2}{\pi} - \frac{4}{\pi} \sum_{k=2,4,\ldots}^{\infty} \frac{1}{(k+1)(k-1)} \cdot \cos(kw_o t)$$

If $\theta$ is then applied to $V_3$, the difference voltage will contain sums and differences of the carrier frequency and output frequency plus their associated harmonics. Assuming $w_o$ is less than $w_c$, only the terms containing harmonics of $w_c$ will be suppressed. As a result, what remains is the fundamental of $w_c$ modulated with the fundamental and harmonics of $w_o$ which can be expressed by applying $\theta$ to $V_4$ as defined by:

$$V_4(wt) = \frac{8V_m}{\pi} \sin(\theta) \sin(w_c t) =$$

$$\frac{16mV_m}{\pi^2} \sin(w_c t) - \frac{16mV_m}{\pi^2} \sum_{k=2,4,\ldots}^{\infty} \frac{1}{(k+1)(k-1)} \cdot$$

$$[\sin(w_c t + kw_o t) + \sin(w_c t - kw_o t)].$$

The modulated expression for $V_5$ can then be obtained by applying $\theta$ to $V_5$ to arrive at $$V_5(wt) = \frac{16mV_m}{\pi^2} |\sin(\omega_o t)| -$$

$$\frac{64mV_m}{\pi^3} \sum_{n=2,4,\ldots}^{\infty} \frac{1}{(n+1)(n-1)} \cos(n\omega_c t) + \frac{64mV_m}{\pi^3} \cdot$$

$$\sum_{n=2,4,\ldots}^{\infty} \sum_{k=2,4,\ldots}^{\infty} \frac{1}{(n+1)(n-1)(k+1)(k-1)} \cdot$$

$$[\cos(nw_c t + kw_o t) + \cos(nw_c t - kw_o t)].$$

Accordingly, the output voltage will simply be $V_6$ unfolded, or:

$$V_{oac}(wt) = (16mV_m/\pi^2) \sin(w_o t).$$

As will be appreciated from the above-discussion, the value of Q becomes critical to the design of the resonant converter. More particularly, the tank circuit 4 may be viewed as a penalty or add-on circuit to conventional PWM converters. In many cases, the penalty may be minimized by operating the converter at higher than normal frequencies, lowering size and cost of the tank circuit 4 and other passive components. In this case, on-state losses and current form factors (F.F.) are directly related. The resonant converters produce circulating currents which require switches with greater power handling capability per watt converted. These additional on-state losses plus the losses of the tank circuit 4 should be less on the commutation losses that the resonant converter minimizes. These factors are taken into account, then the value of Q is selected to be sufficient to improve the switching trajectories.

Figure 3:
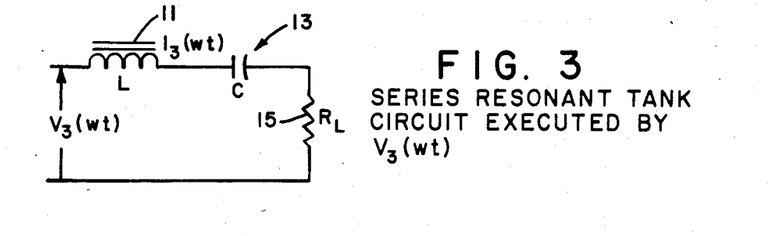
FIG. 3 is a circuit diagram of a series resonant tank circuit.

Accordingly, a preferred series resonant tank circuit 4 employed in the invention is illustrated in FIG. 3 as a series resonant tank circuit 4 which is driven by difference voltage $V_3$, wherein:

$$\theta = \pi/2$$

This condition produces the highest harmonic content and is expressed by the equation:

$$V_3(wt) = V_1(wt) - V_2(wt)$$

as was defined above, and the resultant waveform will be a square wave.

Impedance is then defined as $Z_3$ and will be defined as:

$$Z_3 = R_L + jwL + \frac{1}{jwC} = R_L\left[1 + jQ\left(\frac{w}{w_r} - \frac{w_r}{w}\right)\right]$$

wherein $R_L$ equals the resistancer of the resistor 15.

The half-power frequencies $w_1$ and $w_2$, and the bandwidth B of the system are defined as:

$$w_1, w_2 = w_r\sqrt{1 + \frac{1}{4Q^2}} \pm \frac{W_r}{2Q}$$

$$B = w_2 - w_1 = \frac{w_r}{Q}$$

The current through the tank circuit 4 is then expressed by determining its impedance at every harmonic and applying the results to a Fourier series. More specifically impedance is determined in frequency domain and the results are applied in time domain. Thus, substituting $nw_c$ for w in:

$$Z_3 = R_L\left[1 + jQ\left(\frac{w}{w_r} - \frac{w_R}{w}\right)\right]$$

will give the following:

$$Z_3^{(n)} = R_L \left[ 1 + jQ\left(n - \frac{1}{n}\right) \right]$$

$$V_3(wt) = \frac{8V_m}{\pi} \sum_{n=1,3,\ldots}^{\infty} \frac{1}{n} \sin(nw_c t)$$

$$I_3(wt) = \frac{8V_m}{\pi R_L} \sum_{n=1,3,\ldots}^{\infty} n \frac{1}{\sqrt{1 + Q^2\left(n - \frac{1}{n}\right)^2}} \cdot$$

$$\sin\left[nw_c t - \tan^{-1}\left(Q\left(n - \frac{1}{n}\right)\right)\right]$$

where $w_c = w_r$.

Figure 4:
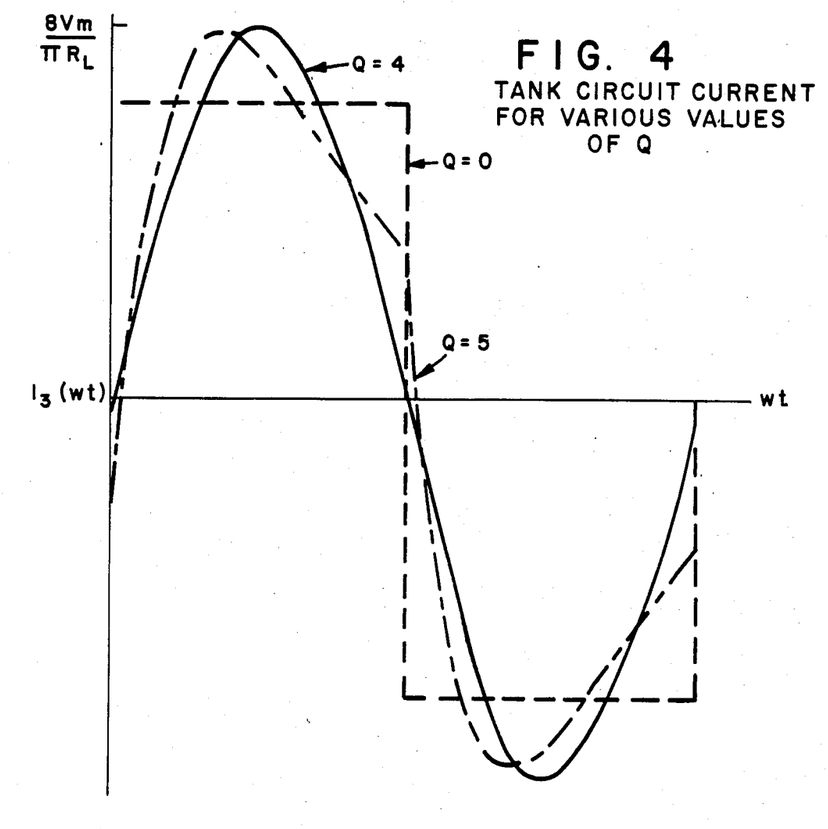
FIG. 4 is a graph showing the current waveforms of the tank circuit of FIG. 3 for varying values of quality factor Q.

As illustrated in FIG. 4, typical current waveforms for various values of Q results in $I_3(wt)$ as being a square wave when Q is equal to 0, and closely approximating a sine wave when Q=4. As to the switching performance of the device, current rares of rise at zero crossings are the parameters of interest for these applications.

Figure 5:
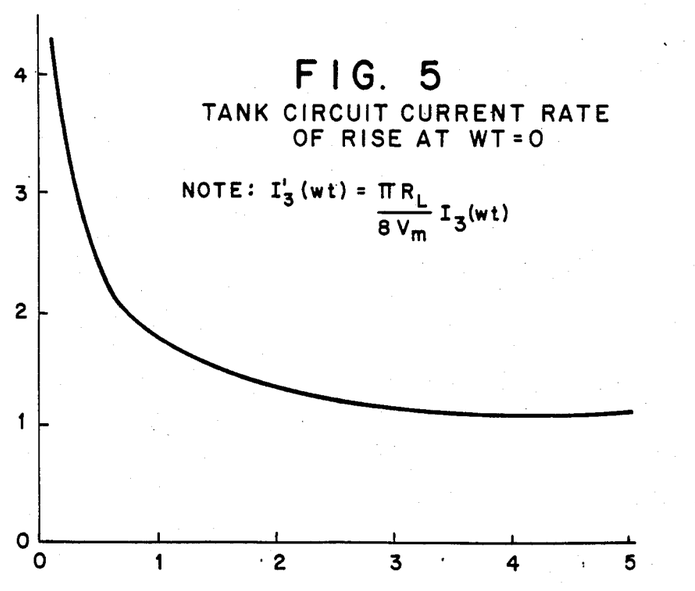
FIG. 5 illustrates the relationship between rate of rise of the current, normalized, as a function of the quality factor Q.

FIG. 5 clearly illustrates normalized values as a function of Q and it is clear from said figure that values of Q above 4 result in little, if any, incremental effect. In the case where Q=4, the bandwidth equals $w_r/4$ which confirms the initial assumptions that the harmonics of $w_c$ are suppressed. Further, it is noted that it is assumed that the $w_0$ values were much less than $w_c$ and harmonic terms of $W_o$ contained in the equation defining the $V_4$ voltage from the tank circuit would not be attenuated by the tank circuit 4. Under these conditions, if the output frequency is set at 60 Hz and the carrier frequency is 20 kHz, then the first 40 harmonics are allowed to pass within the band pass of the tank circuit 4. These effects are further illustrated by the table set forth below which shows the effects of Q on circuit performance.

TABLE 1

| Effects of Q on Circuit Performance | | |
|---|---|---|
| PARAMETERS | LOW $Q^{(1)}$ | HIGH $Q^{(1)}$ |
| Size | | |
| Cost | | |
| Passive Component Losses | | |
| On-State Losses | | |
| Commutation Losses | | |
| Current Form Factor$^{(2)}$ | | |
| Frequency of Operation | | |

$^{(1)}$Effect of parameter with others remaining constant.
$^{(2)}$Current form factor, F.F., defined as
$$F.F. = \frac{I_{rms}}{I_{avg}}$$

Figure 6A:
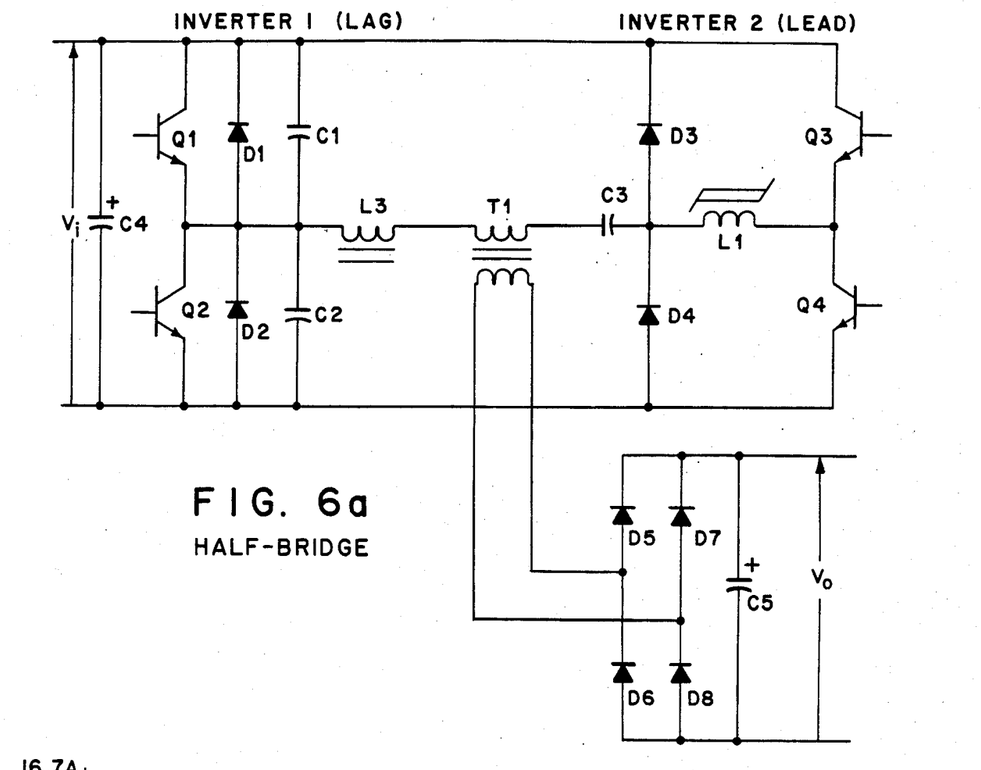
FIGS. 6a and 6b respectively illustrate alternative circuit diagrams of phase-modulated, resonant power processing devices as dc to dc converters.

In the most preferred embodiment, shown in FIG. 6a, the device is especially adapted for use in high frequency applications, i.e., typically above about 20 kHz, typically 500 kHz and up to about 1 mHz. This embodiment finds special use where there is a sine wave current penalty, i.e., $4/\pi$, and ideally fits voltages in off-line switching supplies i.e., AC to DC with 120 V to 240 V input, to a 340 V bus so that switching can be accomplished with readily available 500 Volt transistors.

The invention is further illustrated in FIG. 6a which discloses topologies of a DC to DC converter. In FIG. 6a a half-bridge resonant converter is illustrated as a full-bridge, resonant inverter, operating in a manner substantially different than the typical operation of such devices.

More particularly, in FIG. 6a, transistors $Q_1$ and $Q_2$ and transistors $Q_3$ and $Q_4$ serve to excite at resonance a tank circuit 4 made up of inductor L3, capacitor C3, and transformer T1. The two half-bridge inverters, which respectively include transistors $Q_1$ and $Q_2$, and $Q_3$ and $Q_4$, are operated with a controlled phase displacement as described previously. In the arrangement, capacitors C1 and C2, and saturable reactor L3, in combination, form lossless snubbers to improve the switching trajectory of the commutation which has not been improved by the tank circuit 4. The advantages of adding these capacitors is further discussed in R. L. Steigerwald, ("High-Frequency Resonant Transistor DC-DC Converters", IEEE Trans. Ind. Electron., Vol. IE-31, No. 2, pp. 181–191, May 1984) which disclosure is specifically incorporated by reference herein. The benefits described occur when the capacitors C1 and C2 are added across the switches in the lag inverter. The function of the capacitors is to reduce the dv/dt during turn-off transition and the tank circuit 4 serves the purpose of absorbing the energy during the turn-on transition.

In a highly unobvious modification, the saturable reactor L3, which may be in one embodiment a linear reactor conventionally known to one of ordinary skill in the art, is the lead circuit lossless snubber. More particularly, the reactor L3 serves the purpose of reducing di/dt during turn-on transition and the tank circuit 4 absorbs the energy during the turn-off transition. The saturable reactor L3 supports bus voltage for a period of time sufficient to allow reverse recovery of diodes D3 and D4 and the non-linear effects of this component allows relative reduction in size of components with resultant lower di/dt during turn-on transition.

Figure 6B:
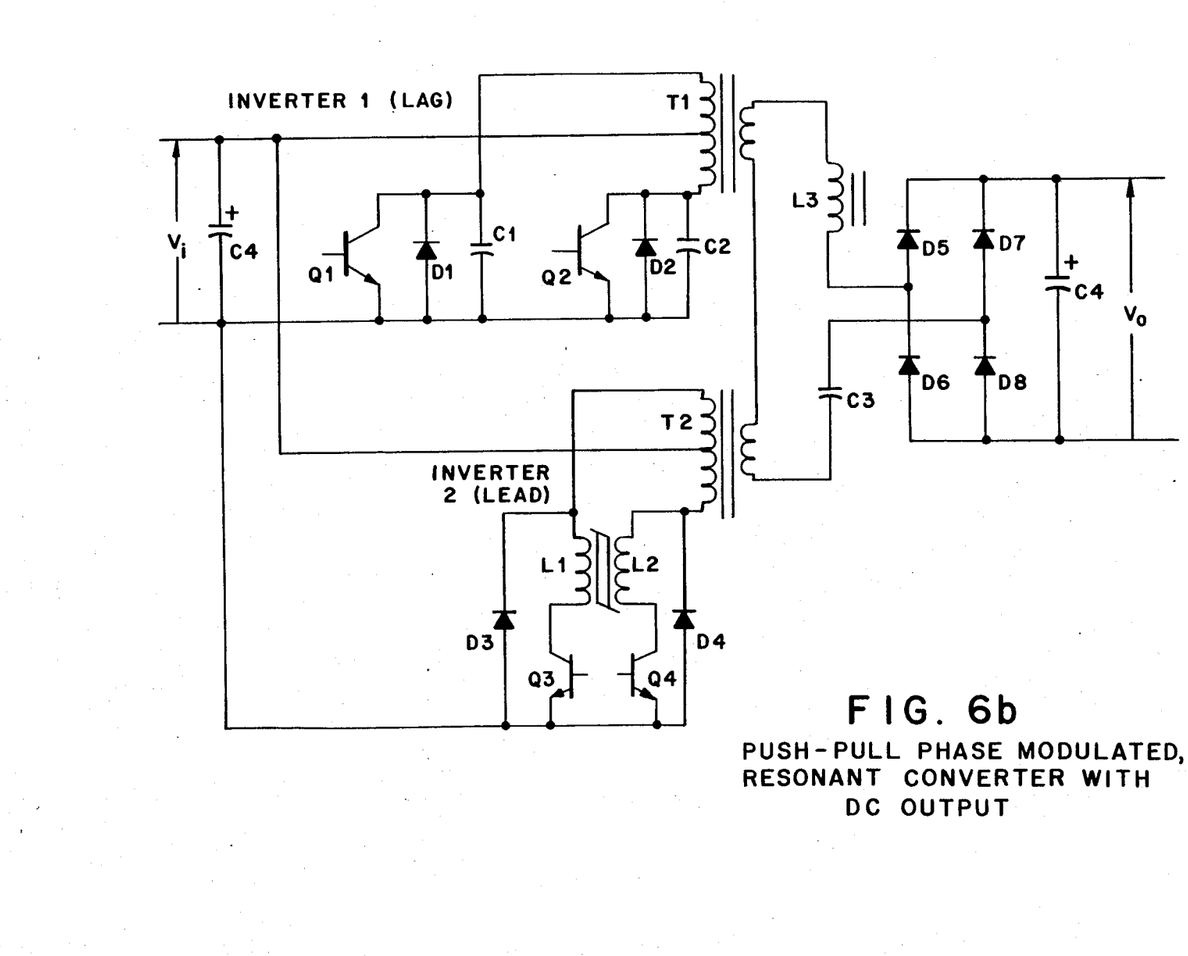

In a second embodiment as illustrated in FIG. 6b, a push-pull, phase-modulated converter is illustrated which operates in the manner previously described. In this case, the tank circuit 4 will be on the secondary side of transformers T1 and T2 with the saturable reactor L3 being implemented of the type having dual windings. Transformers T1 and T2 are of the type which may be fabricated on a common EI core having primaries wound on the outer legs, and the secondary wound on the center leg. The use in this case will be with lower voltages, i.e., in DC to DC applications with 48 volt input. In these uses the penalty is on transistor open circuit voltage. Applications will be, for example, in telecommunications and computer power conditioning.

Figure 7:
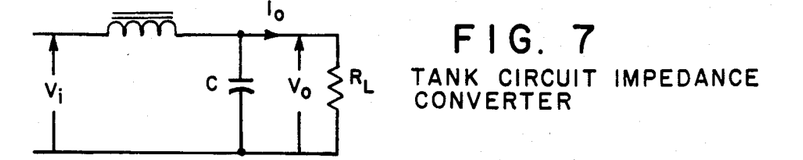
FIG. 7 shows an alternative circuit diagram for the tank circuit employed in accordance with the invention.

In FIG. 7 there is shown still another alternative method for configuring the tank circuit 4, which when excited at resonance, offers the capability of converting the source voltage to a high impedance regardless of load.

In this case, assuming a resistive load $R_L$, the output current will then be defined by $$I_o = \frac{V_i}{R(1 - w^2 LC) + jwL} = \frac{V_i}{jwL} = -jV_i wC$$

if $$w = \frac{1}{\sqrt{LC}}.$$

The impedance converter will find application in negative impedance loads such as those provided by gaseous discharge lighting, for example, as disclosed in U.S. Pat. No. 4,075,476 of the same inventor and which disclosure is also specifically incorporated by reference herein.

Figure 8A:
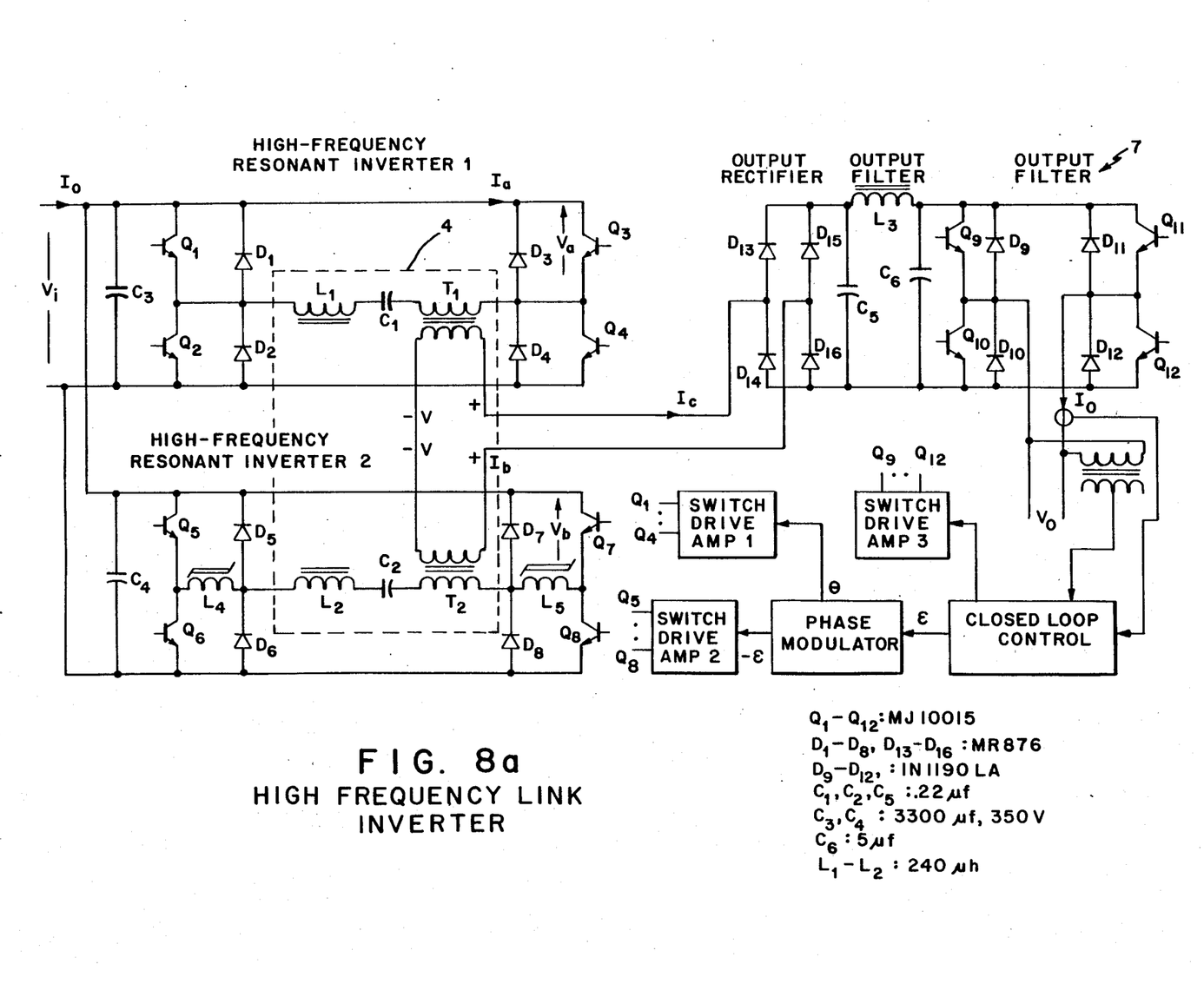
FIGS. 8a and 8b are respectively actual and block circuit diagrams of the high-frequency link inverter for effecting phase modulated, resonant power conversion.

Having generally described the various modifications leading to the invention, reference is now made to FIG. 8a which illustrates a high-frequency link inverter for effecting phase modulated, resonant power conversion. Typically, by "high frequency" is meant frequencies in excess of 20 kHz, typically in one embodiment about 500 kHz, and up to about 1 mHz. In the circuit, there is shown two full bridge inverters 1 and 2 at the input power processing stage and a full bridge inverter 7 at its output power processing stage. The tank circuit is made up of inductors L1 and L2, capacitors C1 and C2, and transformers T1 and T2, is series resonant, and is on the primary side of the transformer. The reason for the connection to the primary side is because capacitors C1 and C2 then perform the secondary function of blocking dc voltages to prevent core saturation. Alternatively, the inductors L1 and L2 could have been combined and placed on the secondary side of the transformers.

In accordance with the inverter of the invention, this inverter was designed to be utility interactive and functional with resistive loads. Utility interactive loading is common in the photovoltaic industry where the inverter is required to interface with a solar array and power grid. In this case, the power factor is unity with the control scheme thereof being shown in block diagram form as FIG. 8b with connection 100 being for resistive loading and connection 200 for utility interactive loading.

Figure 8B:
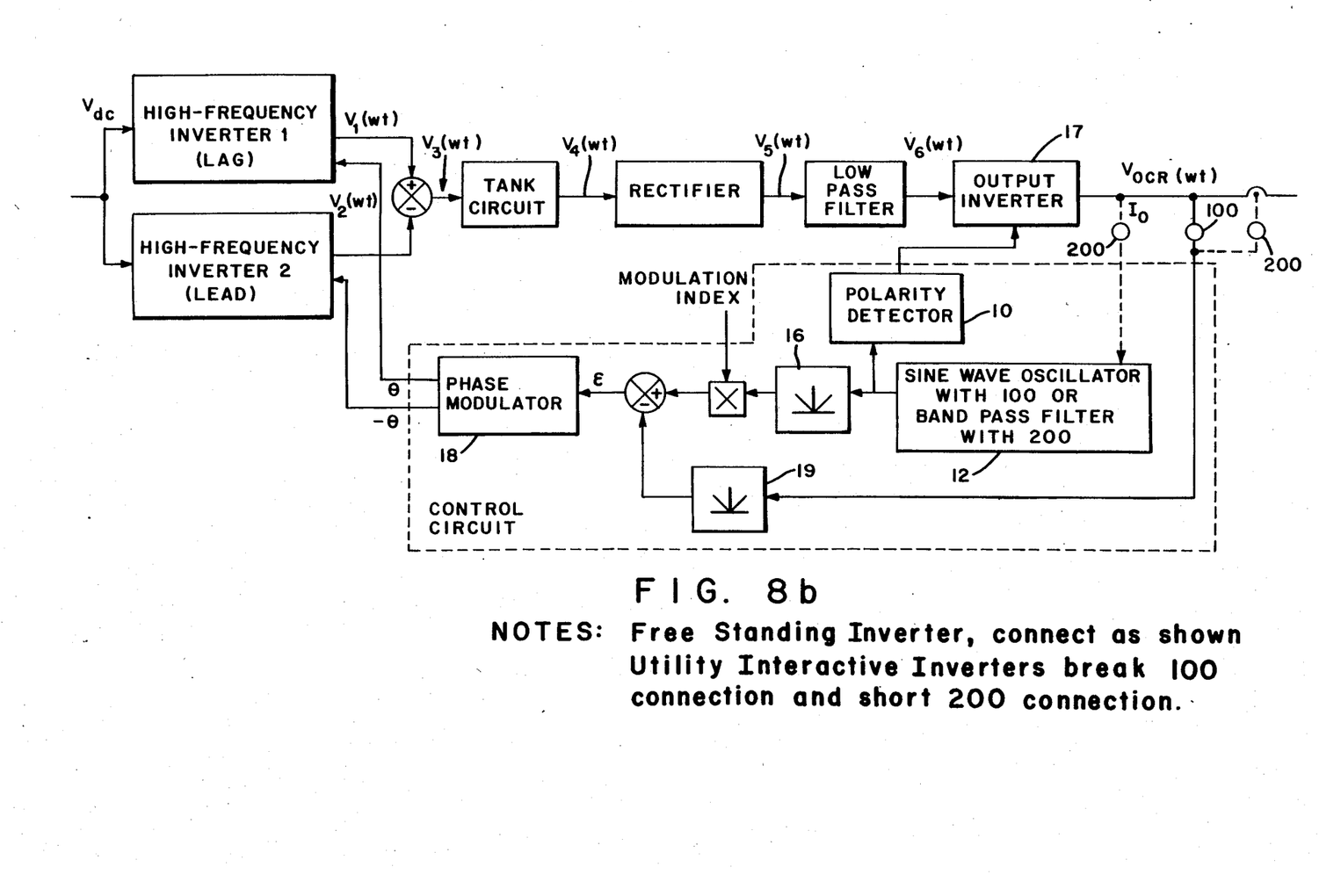

When the control device is to be used in resistive loading situations, a sine wave generator 12 is used as a reference with a polarity detector 10 for sensing the reference polarity from sine wave oscillator 12 and for driving the appropriate transistor pairs of the output inverter 17. The reference sine wave is also fed through an absolute value circuit 16 and the signal therefrom is compared with that from the output inverter 17 which is passed through absolute circuit 19, in which it is then compared to generate an error signal $\epsilon$ to control phase displacement $\theta$. Phase modulator 18 controls the output magnitude from the inverter as defined by the equation $$V_{oac}(wt) = (16mV_m/\pi^2) \sin(w_o t).$$

In the case where the control scheme is connected for utility interactive loading, as connected at connection 200, the line voltage is used as reference and a lead-lag bandpass filter is deployed to filter any distortion present at the inverter's output terminal and to maintain zero phase displacement. In this arrangement, reference is compared with inverter output current.

EXAMPLE

The above discussed device was operated with the closed-loop feedback network modified to produce constant, non-modulated outputs. The operation conditions were studied with phase displacement varied at a low frequency rate.

Figure 9:
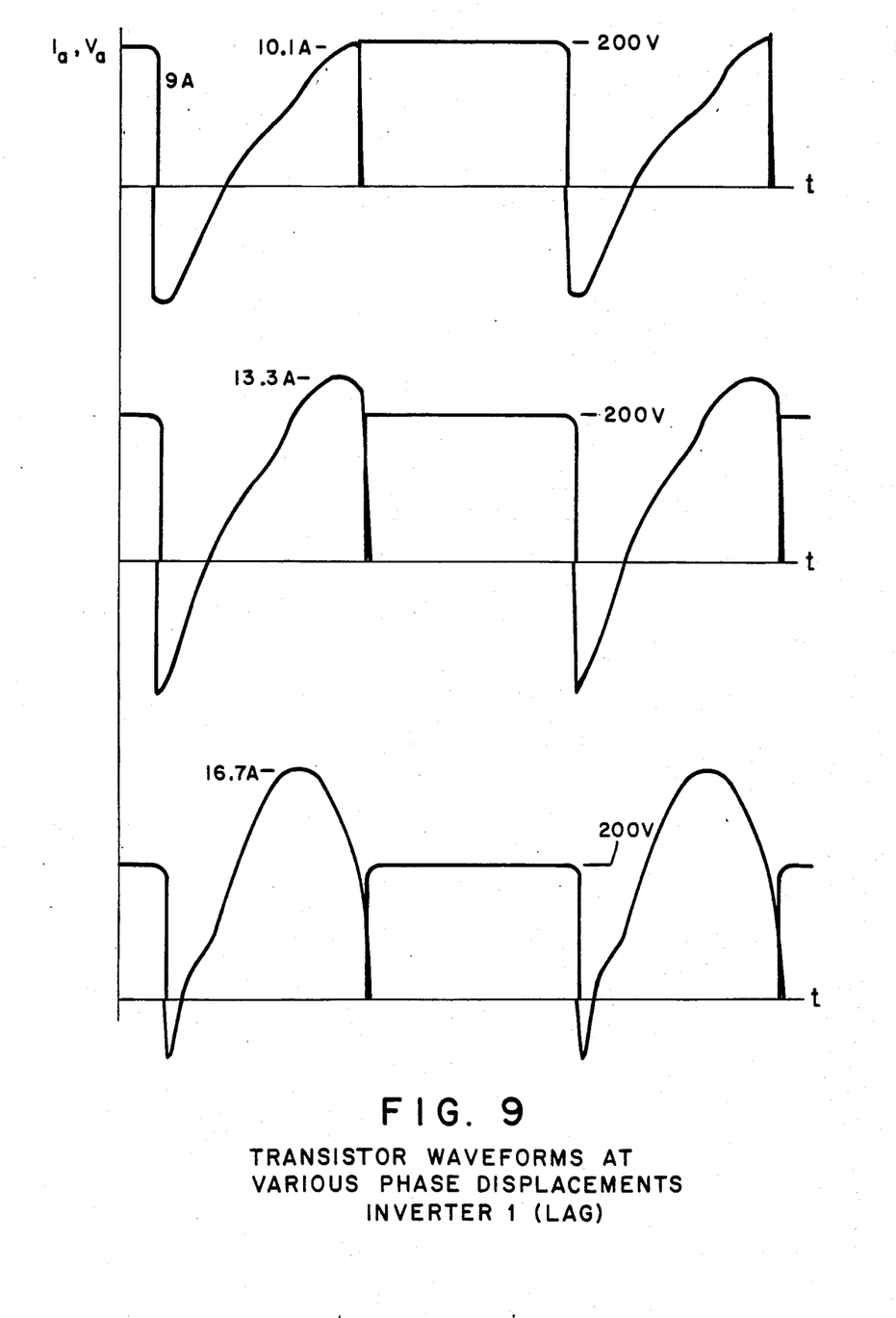
FIGS. 9 and 10 show transistor waveforms, at various phase displacements of the inverters.
Figure 10:
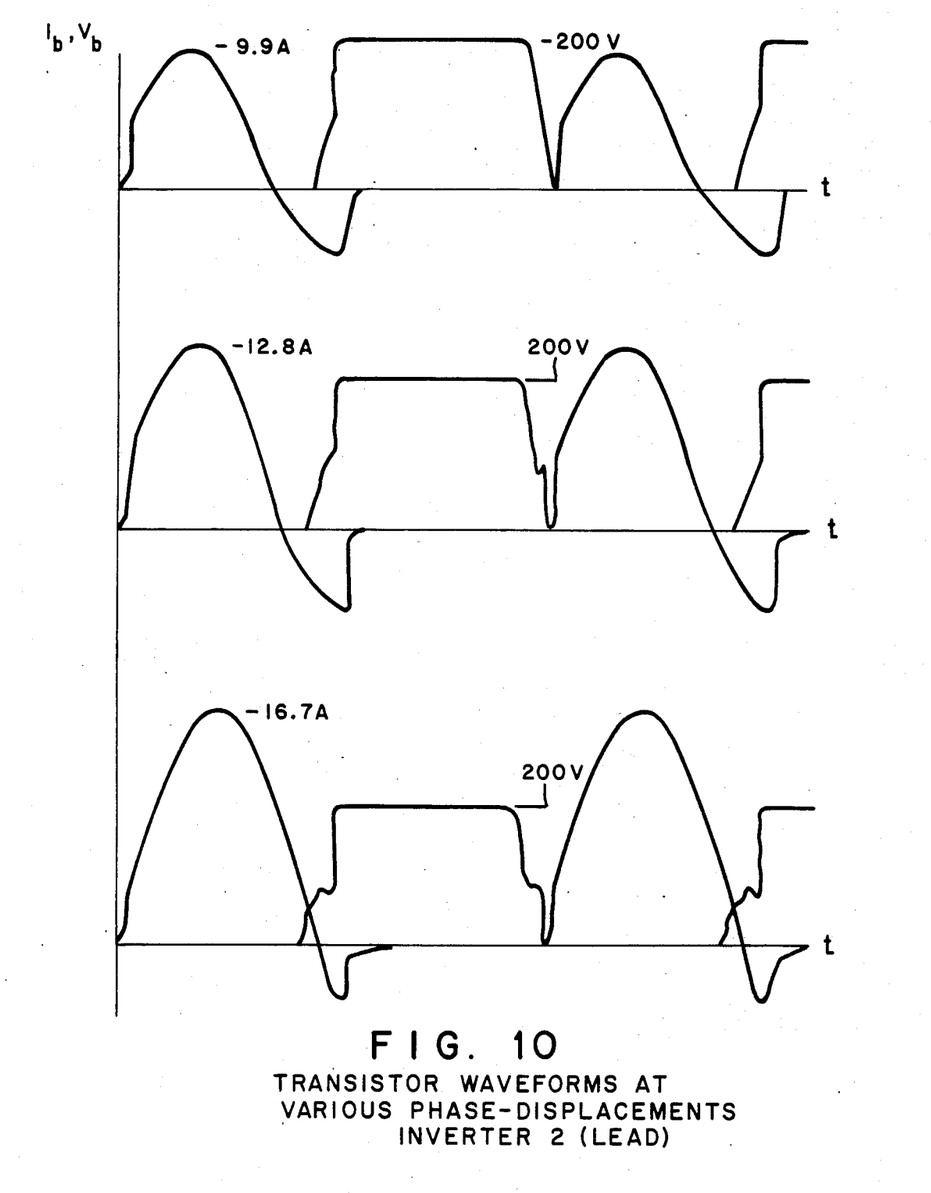

The device were operated at three phase displacements O, $\pi/4$, and $\pi/2$. FIGS. 9 and 10 show the transistor and antiparallel diode waveforms at the three phase displacements. It was observed that inverter 1 operates with a lagging power factor and inverter 2 with a leading power factor. Positive current occurs with transistors conducting, and negative portions with antiparallel diodes conducting.

Figure 11:
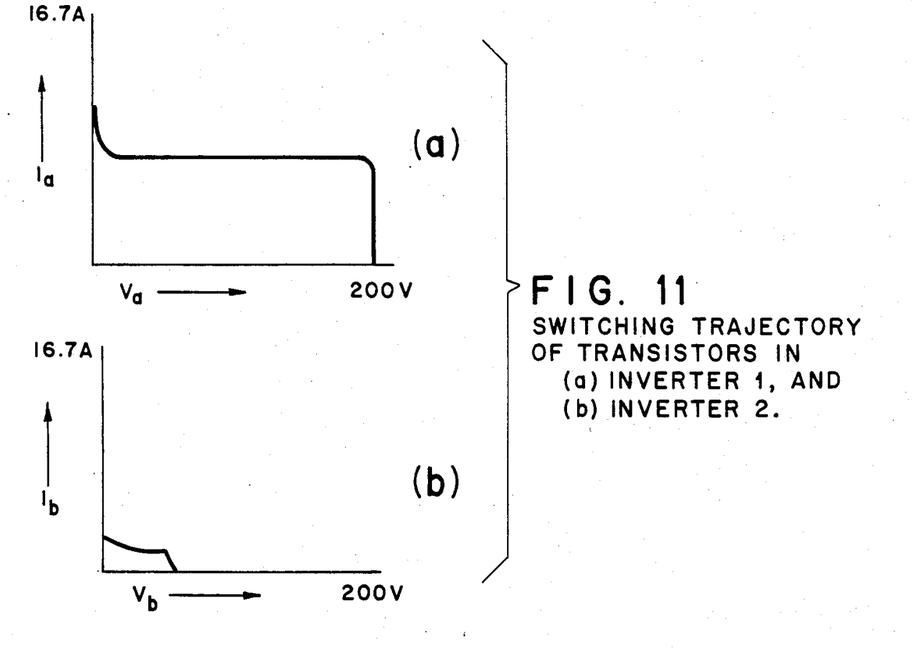
FIG. 11 illustrates generally the switching trajectories of the transistors of device.
Figure 12A:
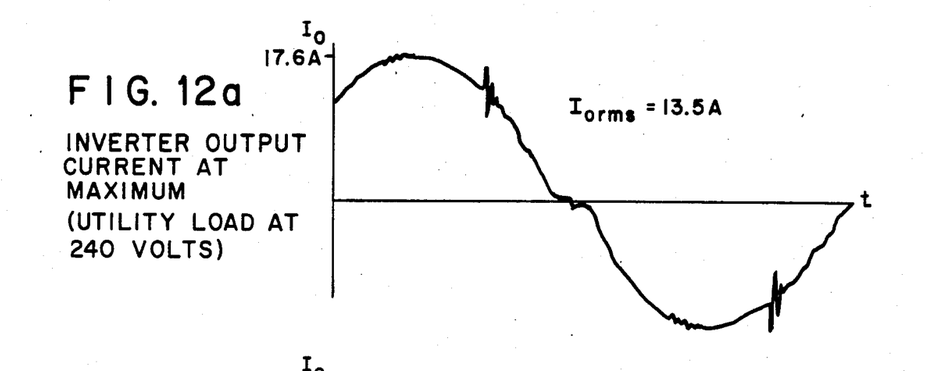
FIGS. 12a, 12b, 13a and 13b show inverter output currents under differing conditions.
Figure 12B:
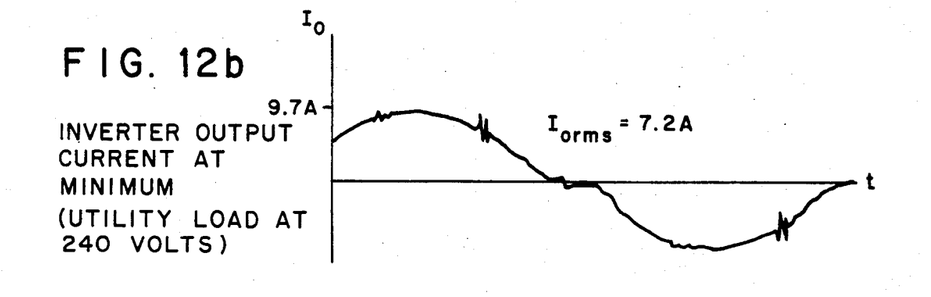
Figure 13A:
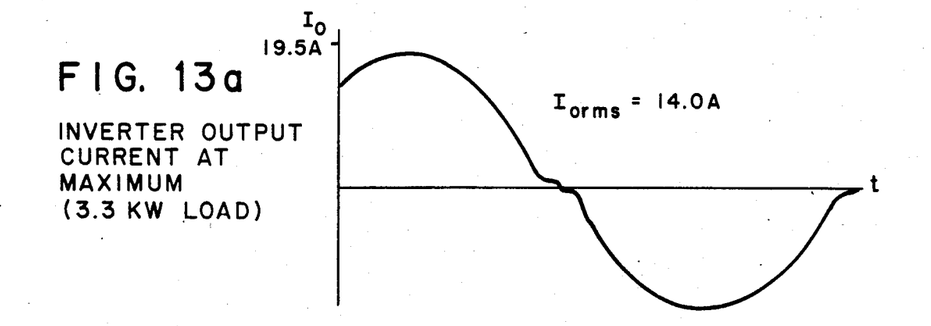
Figure 13B:
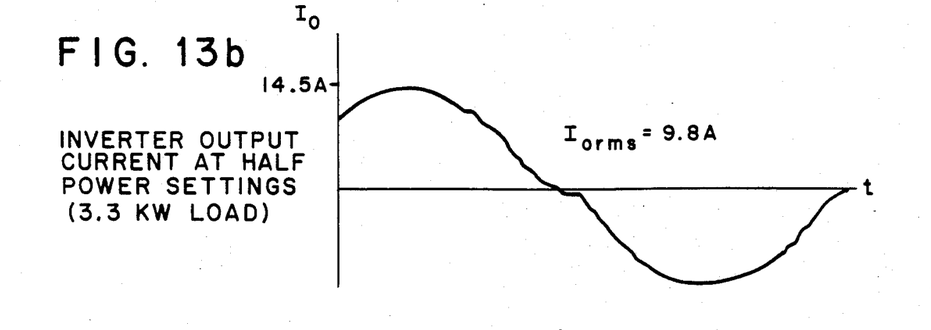

The link inverter was operated at high-frequency, i.e., 25 kHz, the phase displacements varied between 0 and $\pi/2$. At 0 phase displacement there was no circulating current to absorb energy stored in a capacitive snubber, and as such, in accordance with the invention, it was not required. The results of switching trajectory are shown in FIG. 11.

FIGS. 12a, 12b, 13a and 13b show operation under other conditions as is self-explanatory therefrom.

Figure 14:
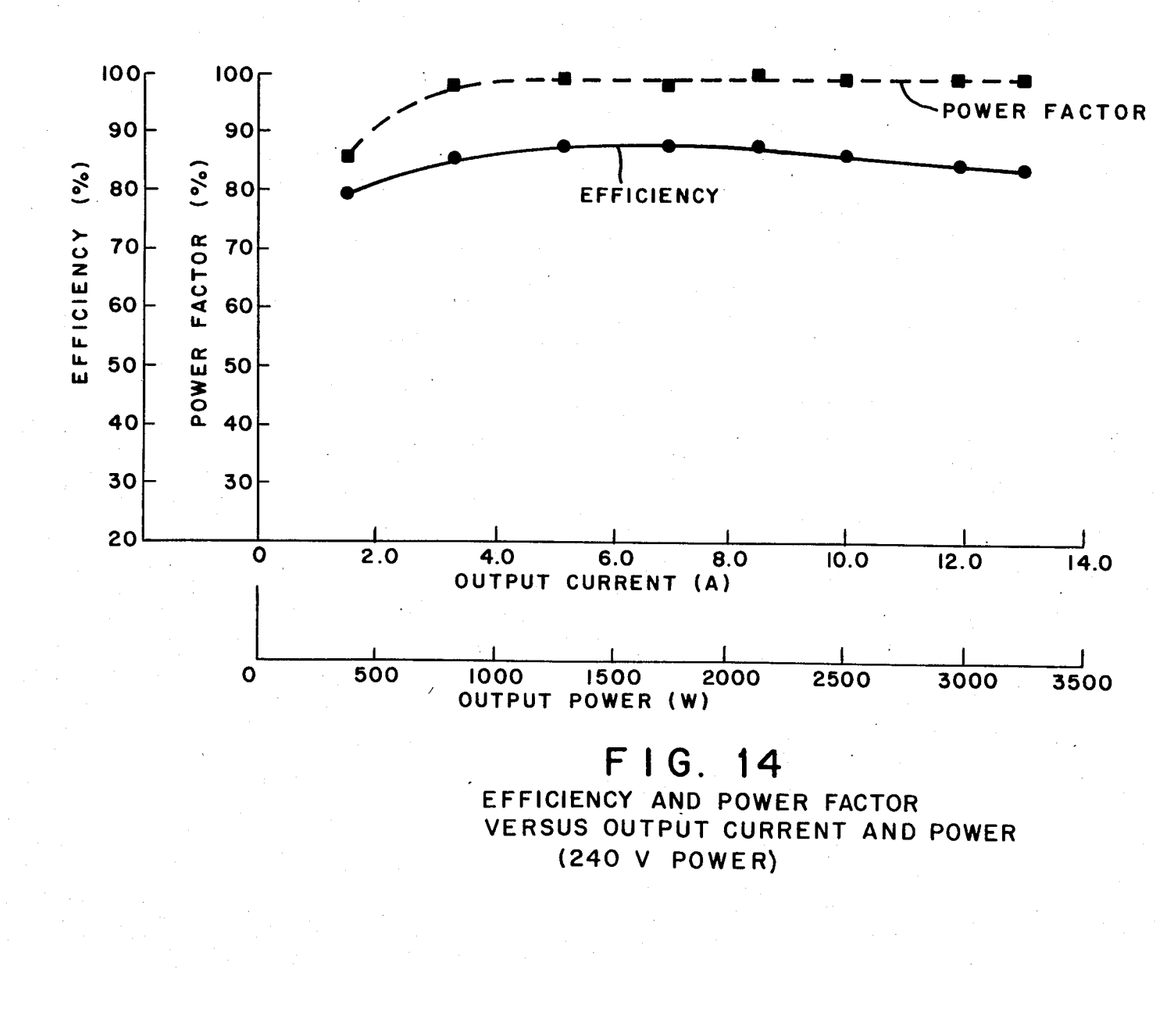
FIG. 14 compares efficiency and power factors to output current and power.

FIG. 14 compares efficiency and power factor to output current and power.

Although the invention has been described in considerable detail with reference to certain preferred embodiments thereof, variations and modifications can be effected within the scope of the invention as described hereinabove and as defined in the appended claims.

What is claimed is:

1. A high-frequency converter for conducting phase modulated, resonant power conversion, comprising:
    (a) first high frequency inverter module for producing first AC voltage at first output frequency;
    (b) second high frequency inverter module for producing second AC voltage at second output frequency, which is substantially the same as said first output frequency and is out of phase with said first output voltage by a selected angular phase displacement;
    (c) mixing means for mixing said first and second output voltages to produce a high frequency carrier which has a selected base frequency impressed on the sidebands thereof;
    (d) tank circuit means for being driven by high frequency carrier and for suppressing harmonics in said high frequency carrier;
    (e) rectifying means for rectifying said carrier;
    (f) filtering means for filtering the rectified carrier; and
    (g) phase modulating means for adjusting the relative angular phase displacement between the output of said first and second high frequency inverter modules to control the base frequency of the line voltage from said filtering means.

2. A converter as in claim 1 further comprising a lead circuit lossless snubber connected to said second high frequency inverter module means for reducing di/dt during turn-on transition of said second high frequency inverter module.

3. A converter as in claim 2 wherein said lossless snubber comprises a saturable reactor.

4. A converter as in claim 1 further comprising output inverter means for inverting the filtered carrier to produce an AC line voltage at said selected base frequency.

5. A converter as in claim 4, wherein said phase modulating means comprises;
    (a) line voltage referencing means for producing a line voltage reference signal;
    (b) amplitude adjustment means for selectively controlling the magnitude of said line voltage;
    (c) output comparator means for comparing said line voltage with said line voltage reference signal to produce a first line voltage error signal; and
    (d) inverter module modulating means for processing said line voltage error signal to adjust the relative, angular phase displacement between the outputs of said first and second high frequency inverter module.

6. A converter as in claim 1 wherein said converter is a dc to dc converter, said tank circuit means comprises an inductor, a capacitor and a transformer arranged for being excited by said first and second high frequency inverter module at resonance, and wherein said phase modulating means is adjusted for operation of said first and second inverter modules with a controlled phase displacement whereby said tank circuit means absorbs energy during turn-off transitions.

7. A converter as in claim 5 wherein said converter is a high frequency link inverter for converting dc to ac, said tank circuit means comprises an inductor, a capacitor and a transformer arranged for being excited by said first and second high frequency inverter modules at resonance, and wherein said phase modulating means is adjusted for operation of said first and second inverter modules with a controlled phase displacement whereby said tank circuit means absorbs energy during turn-off transitions.

8. A converter as in claim 6 wherein said first and second inverter modules are configured as resonant-type inverter modules.

9. A converter as in claim 7 wherein said first and second inverter modules are configured as resonant-type inverter modules.

10. A converter as in claim 5 further comprising proportional drive means for driving power switches in said output inverter means.

11. A converter as in claim 1, further comprising an energy storage module for selectively storing and releasing a reactive, quadrature component of power that is circulated into said inverter apparatus from an electrical load, said storage module comprising:

(a) electrical energy storage means for storing electrical energy;

(b) storage module output means for flowing instantaneous reactive power from said load into said storage means and for flowing stored electrical power from said storage means into said load;

(c) regulator switching means for selectively directing a flow of said reactive power from said load into said storage means and for selectively directing a flow of stored reactive power from said storage means into said load;

(d) second comparator means for comparing said inverter line voltage with a line voltage reference signal to produce a second line voltage error signal;

(e) third comparator means for comparing a storage energy level in said storage means with a storage referencing means to produce a resultant, storage error signal; and (f) switching logic means responsive to said second and third comparator means for controlling said regulator switching means to direct said flow of reactive power from said load into said storage means in response to a first selected charge, set of error signals from said second and third comparator means, and to direct said flow of reactive power from said storage means into said load in response to a second selected, discharge, set of error signals from said second and third comparator means.

12. A converter as in claim 11, wherein said storage module output means is comprised of an output inverter means.

13. A converter as in claim 5, further comprising an energy storage module for selectively storing and releasing a reactive, quadrature component of power that is circulated into said inverter apparatus from an electrical load, said storage module comprising:

(a) electrical energy storage means for storing electrical energy;

(b) storage module output means for flowing instantaneous reactive power from said load into said storage means and for flowing stored electrical power from said storage means into said load;

(c) regulator switching means for selectively directing a flow of said reactive power from said load into said storage means and for selectively directing a flow of stored reactive power from said storage means into said load;

(d) second comparator means for comparing said inverter line voltage with a line voltage reference signal to produce a second line voltage error signal;

(e) third comparator means for comparing a storage energy level in said storage means with a storage referencing means to produce a resultant, storage error signal; and (f) switching logic means responsive to said second and third comparator means for controlling said regulator switching means to direct said flow of reactive power from said load into said storage means in response to a first selected charge, set of error signals from said second and third compartor means and to direct said flow of reactive power from said storage means into said load in response to a second selected, discharge, set of error signals from said second and third comparator means.

14. A converter as in claim 6 further comprising a lead circuit lossless snubber connected to said second high frequency inverter module means for reducing di/dt during turn-on transition of said second high frequency inverter module.

15. A converter as in claim 14 wherein said lossless snubber comprises a saturable reactor.

* * * * *